(12) United States Patent
Nakamura (10) Patent No.: US 7,262,872 B2
(45) Date of Patent: Aug. 28, 2007

(54) PRINTING SYSTEM AND METHOD FOR NETWORK CONTAINING PRINTERS WITH PULL-PRINTING AND PRINTERS WITHOUT PULL-PRINTING

(75) Inventor: Jun Nakamura, Mitaka (JP)

(73) Assignee: Fuji Xerox Co., Ltd., Tokyo (JP)

( * ) Notice: Subject to any disclaimer, the term of this patent is extended or adjusted under 35 U.S.C. 154(b) by 857 days.

(21) Appl. No.: 10/303,762

(22) Filed: Nov. 26, 2002

(65) Prior Publication Data
US 2003/0098990 A1 May 29, 2003

(30) Foreign Application Priority Data
Nov. 28, 2001 (JP) ............................ 2001-363469

(51) Int. Cl.
G06F 15/00 (2006.01)
G06K 1/00 (2006.01)

(52) U.S. Cl. ...................... 358/1.14; 358/1.15; 710/16; 709/219

(58) Field of Classification Search ................ 358/1.14, 358/1.15, 1.13; 709/203, 219; 710/15, 16, 710/8
See application file for complete search history.

(56) References Cited

U.S. PATENT DOCUMENTS

| | | | |
|---|---|---|---|
| 6,219,151 B1 * | 4/2001 | Manglapus et al. ......... | 358/1.15 |
| 6,519,048 B1 * | 2/2003 | Tanaka ....................... | 358/1.13 |
| 6,748,471 B1 * | 6/2004 | Keeney et al. .............. | 710/220 |
| 2002/0085224 A1 * | 7/2002 | Price et al. ................. | 358/1.13 |
| 2002/0085228 A1 * | 7/2002 | Yagita ........................ | 358/1.15 |
| 2003/0002073 A1 * | 1/2003 | Berkema et al. ........... | 358/1.15 |

FOREIGN PATENT DOCUMENTS

| | | |
|---|---|---|
| JP | A-09-167068 | 6/1997 |
| JP | A 10-271263 | 10/1998 |
| JP | 2000112687 A * | 4/2000 |
| JP | A 2001-184180 | 7/2001 |
| JP | A-2001-216116 | 8/2001 |
| JP | A-2001-228986 | 8/2001 |
| JP | A-2001-306426 | 11/2001 |

* cited by examiner

Primary Examiner—Aung S. Moe
Assistant Examiner—Dillon Murphy
(74) Attorney, Agent, or Firm—Oliff & Berridge, PLC (57) ABSTRACT

A printing system configured by connecting, over a network, a printing request instruction terminal for making a printing request including reference information that indicates a storage location of the paper original data, a server which accepts the printing request from the printing request instruction terminal, designates a printer as a printing destination according to the printing request and makes a printing instruction to that printer, and multiple printers which execute printing according to the printing instruction from the server, wherein the server comprises: an examination unit which, when receives the printing request from the printing request instruction terminal, examines whether or not the printer designated as the printing destination has a pull-printing function to execute printing by obtaining the paper original data according to the reference information; and a print control unit which obtains the paper original data according to the reference information when it is found as a result of the examination that the printer designated as the printing destination does not have the pull-printing function and sends the obtained paper original data together with the printing instruction to the printer.

24 Claims, 9 Drawing Sheets

PRINTING SYSTEM AND METHOD FOR NETWORK CONTAINING PRINTERS WITH PULL-PRINTING AND PRINTERS WITHOUT PULL-PRINTING

BACKGROUND OF THE INVENTION

1. Field of the Invention

The present invention relates to a printing system and a print control method, and more particularly to a printing system and a print control method which efficiently use a pull-printable printer even in a printing system, which makes distributed and divisional output, to efficiently transmit image data so to prevent a network from becoming busy.

2. Description of the Related Art

As a known printing system, there is a technology disclosed in Japanese Patent Application Laid-Open No. 10-271263. This system transmits image data which is read by a scanner to a local copy section of a management device before sending it to a printer.

Therefore, the system of the Japanese Patent Application Laid-Open No. 10-271263 transmits the image data two times, namely from the scanner to the management device and from the management device to the printer.

In other words, the system having such a transmission mode often makes a network busy and takes long time to start printing. Thus, the system cannot efficiently use respective devices.

In order to improve the above situation, printing devices having a function called "pull-print" are being provided in recent years.

The pull-printing function is to operate, when information indicating a location where data to be printed is stored on the network (hereinafter referred to as the "reference information"), e.g. a URL (Uniform Resource Locator), is input, to obtain data on the information according to the reference information and to perform printing according to the obtained data.

When this pull-printing function is used, a load on the network can be reduced because data to be printed is sent from its location to the printer only one time.

An example of the technology using a printing device having the above pull-printing function is disclosed as a pull-print printing device in Japanese Patent Application Laid-Open No. 2001-184180.

The Japanese Patent Application Laid-Open No. 2001-184180 makes reference to the pull-print printing device but does not have a mechanism for scheduling multiple printing jobs of multiple printers and does not consider a printing system for performing distributed and divisional output.

As described above, the Japanese Patent Application Laid-Open No. 2001-184180 refers to the pull-print printing device but does not have a mechanism for scheduling multiple printing jobs of multiple printers. Thus, conventionally no reference has been made about a printing system for performing distributed and divisional output.

SUMMARY OF THE INVENTION

The present invention was achieved in view of the above circumstances to provide a printing system and a print control method which efficiently use a pull-printable printer even in a printing system which makes distributed and divisional output to efficiently transmit image data so to prevent a network from becoming busy.

According to an aspect of the present invention, there is provided a printing system configured by connecting, over a network, a printing request instruction terminal for making a printing request including reference information that indicates a storage location of paper original data, a server which accepts the printing request from the printing request instruction terminal, designates a printer as a printing destination according to the printing request and makes a printing instruction to that printer, and multiple printers which execute printing according to the printing instruction from the server, wherein the server comprises: an examination unit which, when receives the printing request from the printing request instruction terminal, examines whether or not the printer designated as the printing destination has a pull-printing function to execute printing by obtaining the paper original data according to the reference information; and a print control unit which obtains the paper original data according to the reference information when it is found as a result of the examination by the examination by the examination unit that the printer designated as the printing destination does not have the pull-printing function and sends the obtained paper original data together with the printing instruction to the printer.

According to an aspect of the invention, since it is so configured that, when the server accepts a printing request from a printing request instruction terminal, if a printer designated as a printing destination does not have the pull-printing function, the server obtains paper original data according to the reference information and sends the obtained paper original data together with the printing instruction to that printer, even in a printing system which makes distributed and divisional output, a pull-printable printer can be utilized efficiently, whereby, it is possible to efficiently transmit image data and prevent a network from becoming busy.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

One embodiment of the printing system according to the present invention will be described in detail with reference to the accompanying figures.

Figure 1:
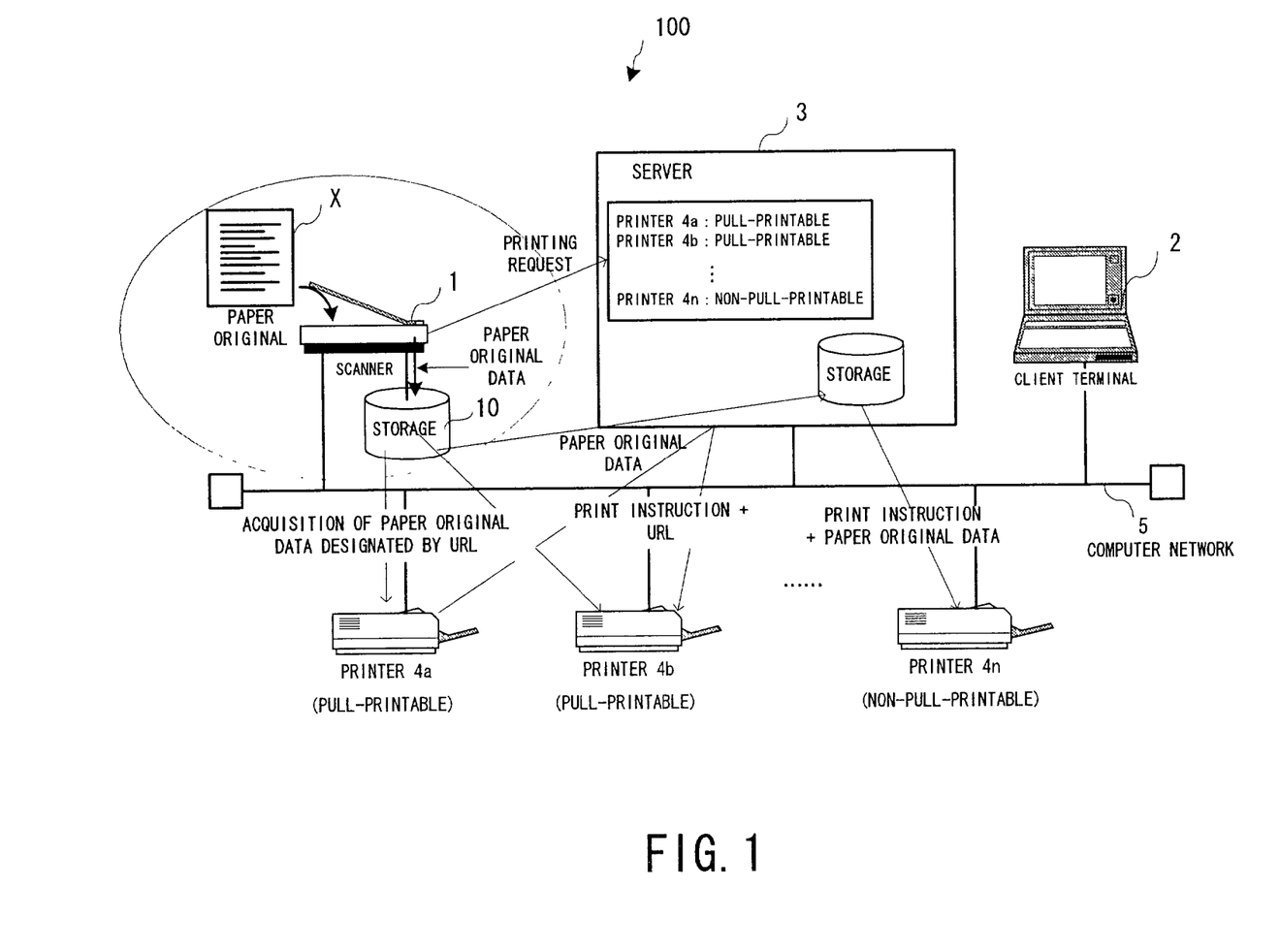
FIG. 1 is a diagram showing an example structure of a printing system to which the present invention is applied.

FIG. 1 is a diagram showing an example structure of a printing system 100 according to the present invention.

As shown in FIG. 1, this printing system 100 has a scanner 1, a client terminal 2, a server 3, and multiple printers 4a to 4n, which are connected to a network 5.

Here, the scanner 1 scans a paper original X, stores paper original data in a storage device 10 such as a hard disk (HD), and transmits to the previously set server 3 a printing request about the paper original data by a user and reference information (URL: Uniform Resource Locator) which is used to refer to the stored paper original data or indicates a location on the network 5.

The scanner 1 performs reading of all or part of the accumulated paper original data, deletion or acquisition of data size or the like in response to a request from an outside device such as the server 3, the printers 4a to 4n or the like.

The client terminal 2 which is a user terminal instructs the printers 4a to 4n to print in response to a request from a user or requests the server for use of application software usable by the system. Specifically, the client terminal 2 is a personal computer (P/C) or the like.

The server 3 performs control and management of printing by this system. For example, it receives a printing request from the scanner 1 and the client terminal 2 and performs a printing processing using one or multiple printers among the multiple printers 4a to 4n according to the received printing request.

And, the server 3 is provided with a connection part which connects at least one scanner 1 and the multiple printers 4a to 4n [at least one of them has a printing function which enables to print by voluntarily obtaining paper original data according to reference information (URL) (hereinafter referred to as the "pull-printing function")]. It also has an examination unit for checking whether the multiple printers 4a to 4n connected to the server can make pull-printing. It also has a part which uses the reference information sent from the scanner 1 to perform reading of the accumulated paper original image data, deletion and acquisition of data size. Besides, the server 3 has a unit which divides a print job to print as divided jobs when it is designated to make distributed or divisional output by the multiple printers 4a to 4n.

Specifically, the server 3 is a workstation (W/S), a personal computer (P/C) or the like.

The printers 4a to 4n print according to a printing instruction sent from the server 3. In this case, the printer 4a and the printer 4b have the pull-printing function, indicating pull-printable printers, but the printer 4n does not have the pull-printing function, indicating a non-pull-printable printer.

The computer network 5 is a communication network which connects the components of the system for communications among them and configured as, for example, a local area network (LAN).

Here, a series of operations of the system configured as described above will be described briefly.

Figure 2:
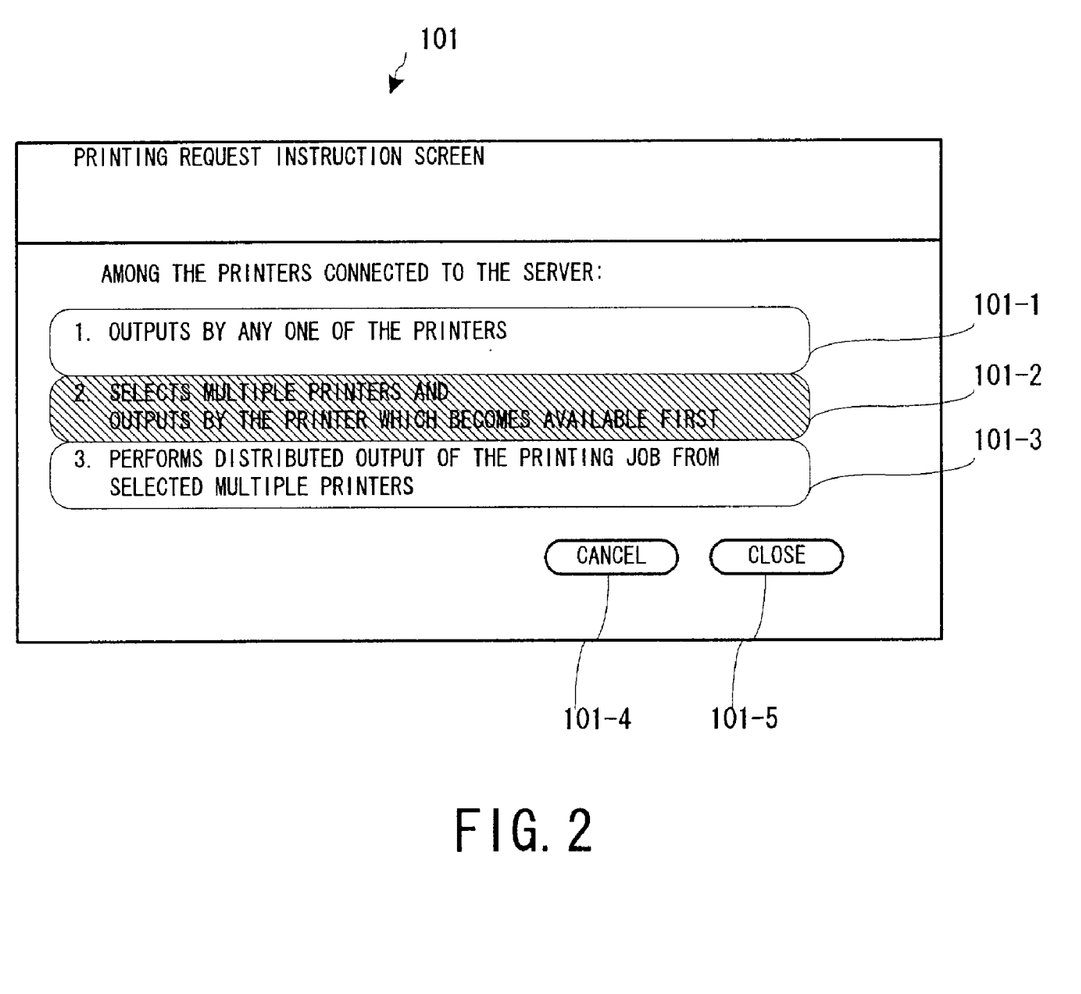
FIG. 2 is a diagram showing an example structure of a printing request instruction screen.

First, a user uses the scanner 1 to scan a paper original X to be printed. The user selects and determines one printing request on a printing request instruction screen 101 shown in FIG. 2 from printing requests (1) outputs by any printer, (2) selects multiple printers and outputs by the printer which becomes available first, and (3) performs distributed output of a printing job from selected multiple printers among the printers 4a to 4n connected to the server 3.

The scanner 1 stores the scanned paper original data in the storage device 10 such as a hard disk, and the printing request set by the user is transmitted together with reference information (URL) used to make reference to the paper original data to the server 3.

The server 3 accepts the above printing request and generates a print job. And, the pertinent printer or printers print according to the generated print job.

Next, the operations of the pull-printable printer 4a and the server 3 after any of the above printing requests (1) to (3) is determined by the user will be described.

Figure 3:
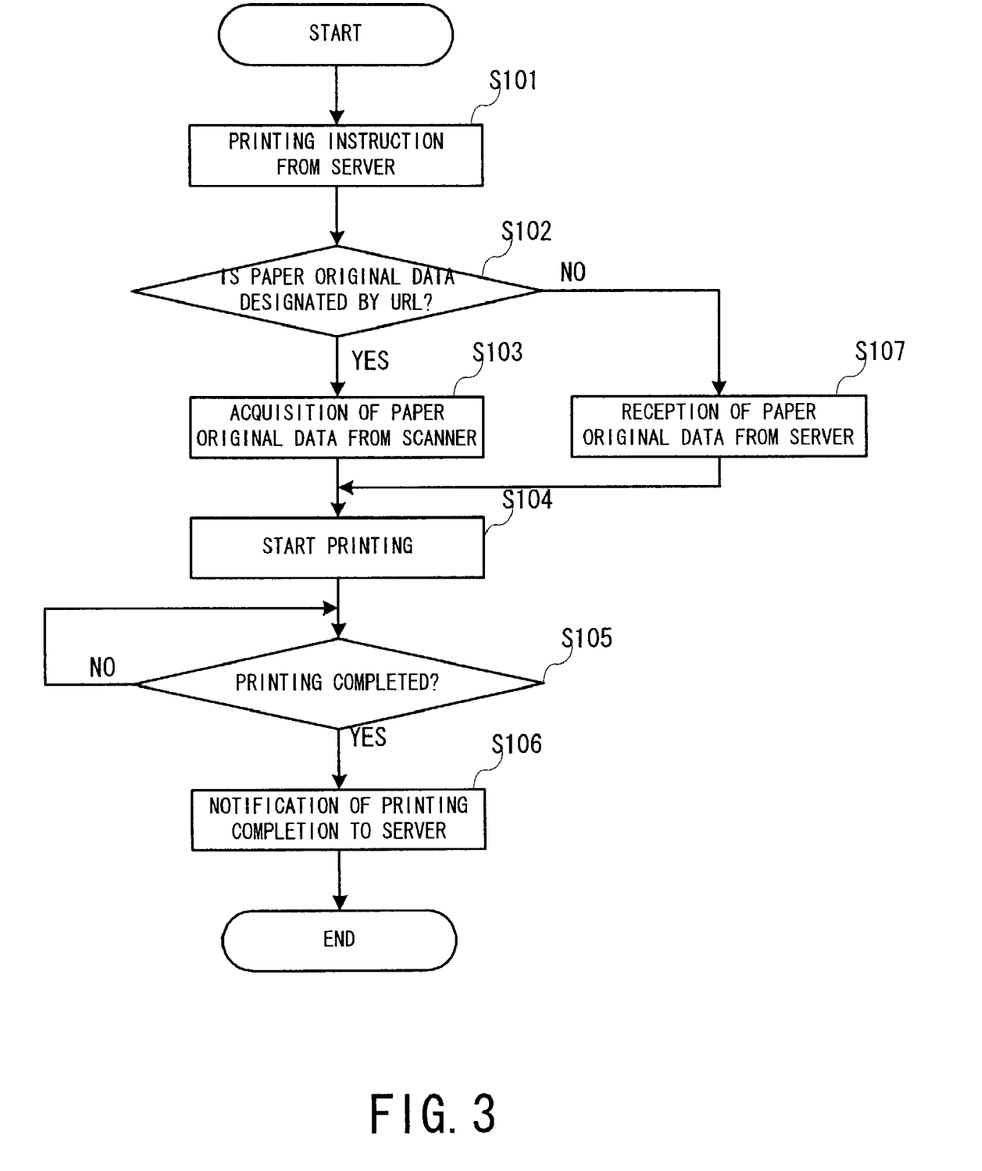
FIG. 3 is a flow chart showing a printing processing procedure of a pull-printable printer when printing is requested by a server.

FIG. 3 is a flow chart showing a printing processing procedure by the pull-printable printer 4a upon the printing instruction from the server 3.

As shown in FIG. 3, after accepting the printing instruction from the server 3 (step S101), the pull-printable printer 4a judges whether the paper original data to be printed is designated by the reference information (URL) (step S102).

Here, when the paper original data has been designated by the reference information (URL) (step S102, YES), the paper original data to be printed is obtained from the scanner 1 according to the reference information (URL) (step S103).

After the paper original data is obtained, it is printed according to the printing instruction (step S104).

After the printing is completed (step S105, YES), the completion of printing is informed to the server 3 (step S106), and the printing procedure is terminated.

Meanwhile, when it is found by the judging process in the step S102 that the paper original data has not been designated by the reference information (URL)(step S102, NO), the paper original data to be printed being sent from the server 3 is received (step S107), and the procedure returns to the step S104 to execute the same procedure.

Figure 4:
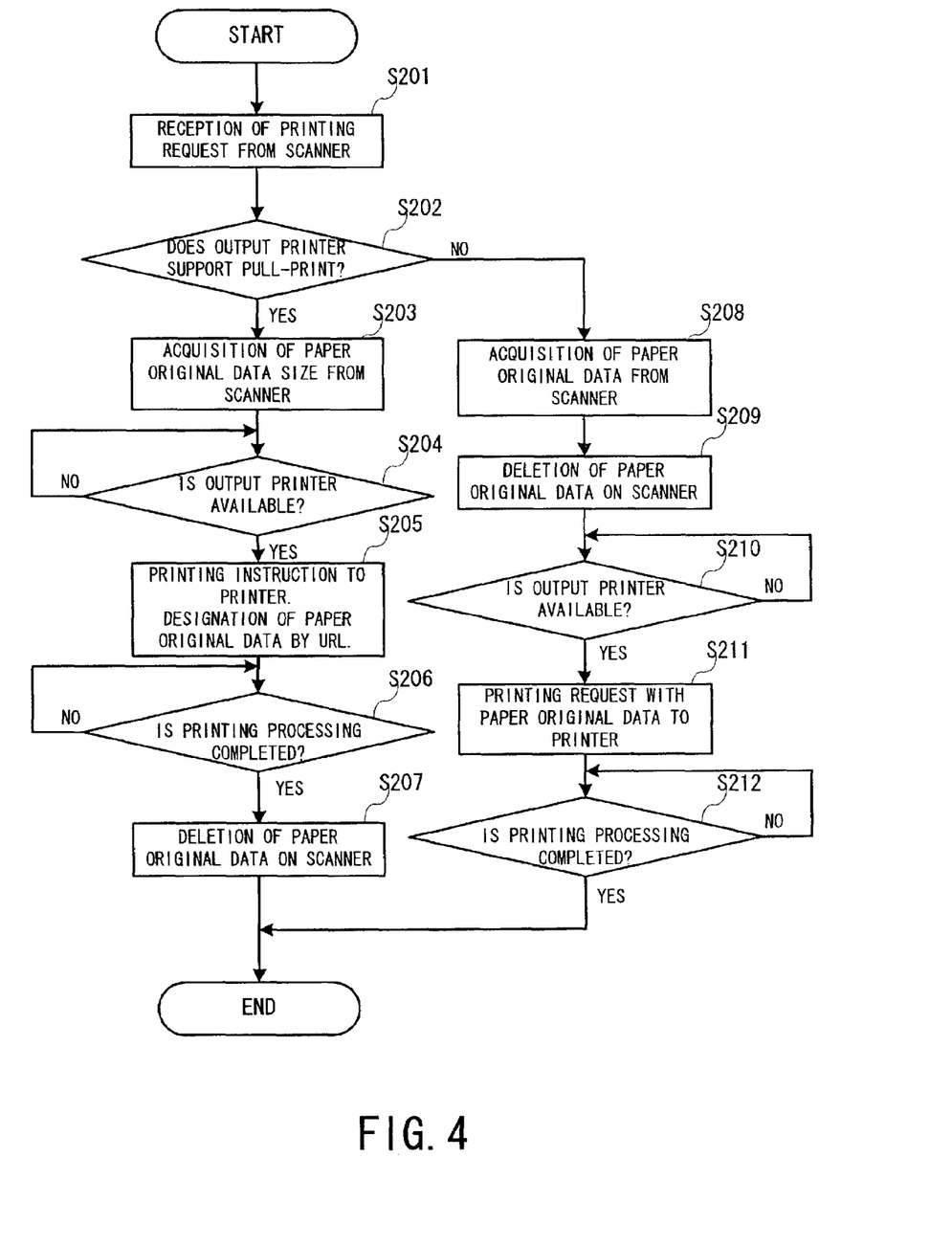
FIG. 4 is a flow chart showing a printing processing procedure by a server which has received a printing request from a scanner, and particularly showing a processing procedure when it is designated by a user to output from any one among printers connected to the server.

FIG. 4 is a flow chart showing the printing processing procedure by the server 3 which has accepted the printing request from the scanner 1, wherein the user specifies output by a desired printer among the printers connected to the server 3.

As shown in FIG. 4, after accepting the printing request from the scanner 1 (step S201), the server 3 checks whether the output printer designated by the user supports the pull-printing function (step S202).

Here, when the output printer supports the pull-printing function (step S202, YES), size information on the paper original data is obtained from the scanner 1 (step S203).

After the size information is obtained, it is checked whether the output printer is available or not (step S204).

When the output printer is available (step S204, YES), the output printer is requested to print. Specifically, the output printer has the pull-printing function to send the printing instruction and the reference information (URL) about the paper original data to the output printer to instruct printing (step S205).

Then, it is checked whether the output printer has completed printing. Specifically, it is checked whether the output printer has issued a printing completion notice (step S206).

When the output printer has completed printing (step S206, YES), the scanner 1 is requested to delete the paper original data, which was printed, among the paper original data on the scanner 1, namely stored in the storage device 10 disposed on the part of the scanner 1 (step S207).

After the deletion is performed, the processing here is terminated.

When it is found as a result of the examination in the step S202 that the output printer designated by the user did not support the pull-printing function (step S202, NO), the paper original data is obtained from the scanner. Specifically, the paper original data to be printed is obtained according to the reference information (URL) received together with the printing request (step S208).

After the paper original data is obtained, the scanner is requested to delete the paper original data to be printed which is stored in the storage device 10 disposed on the part of the scanner 1, namely the original of the obtained paper original data (step S209).

Then, it is checked whether the output printer is available or not (step S210), and when the output printer is available (step S210, YES), the output printer is requested to print. Specifically, the printing instruction and the paper original data are sent to the output printer to instruct printing (step S211).

Then, it is checked whether the output printer has completed printing. Specifically, it is checked whether the output printer has issued a printing completion notice (step S212).

When the output printer has completed printing (step S212, YES), the processing here is terminated.

By processing as described above, the printing system for performing the distributed and divisional output can also effectively use the pull-printable printer. Specifically, when the output printer designated by the user supports the pull-printing function, the server does not obtain the paper original data but sends the reference information (URL) to the output printer, which can make the pull-print, to ask printing. Therefore, it is not necessary to make an unnecessary network transmission in order to output by the pull-printable printer.

Figure 5:
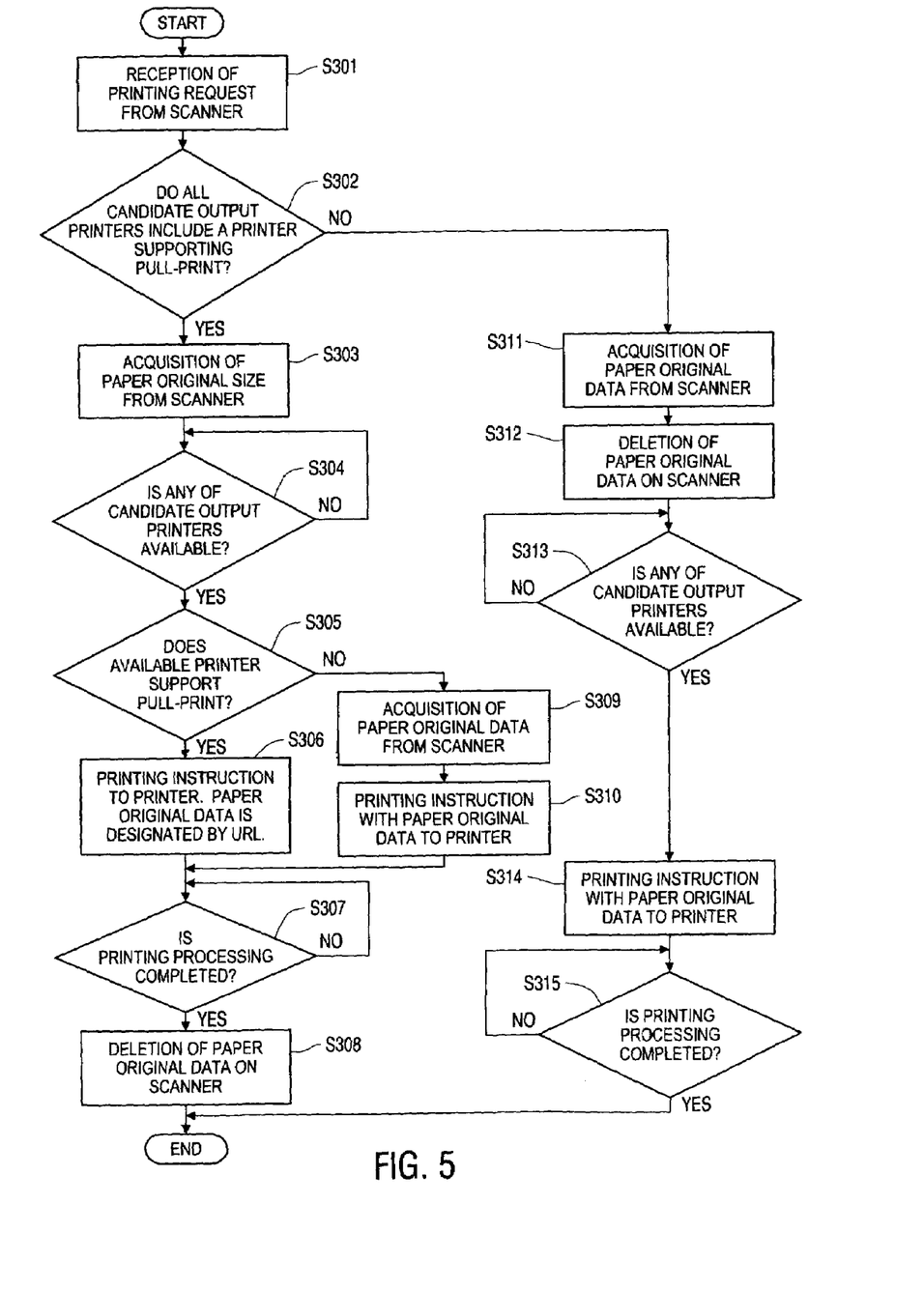
FIG. 5 is a flow chart showing a printing processing procedure by a server which has received a printing request from a scanner, and particularly showing a processing procedure in that when it is designated by a user to output from a single printer which becomes available first among multiple printers selected from multiple printers connected to the server.

FIG. 5 is a flow chart showing a printing procedure by the server 3 which has accepted the printing request from the scanner 1, wherein it is designated by the user to select multiple printers from the multiple printers which are connected to the server 3 and to output from a printer which becomes available first.

As shown in FIG. 5, the server 3 accepts the printing request from the scanner 1 (step S301), and it is checked whether all the candidate output printers designated by the user include any printer which supports the pull-printing function (step S302).

When any of the candidate output printers supports the pull-printing function (step S302, YES), size information about the paper original data to be printed is obtained from the scanner 1 (step S303).

After the paper original data size information is obtained, it is checked which of the candidate output printers is available now (step S304).

When the available printer is detected, it is checked whether the available printer supports the pull-printing function (step S305).

When the pull-printing function is supported by the available printer (step S305, YES), the available printer is requested to print. Specifically, because the output printer has the pull-printing function, the printing instruction and the reference information (URL) about the paper original data are sent to the output printer to instruct printing (step S306).

Then, it is checked whether the output printer has completed printing. Specifically, it is checked whether the output printer has issued a printing completion notice (step S307).

When the output printer has completed printing (step S307, YES), the scanner is requested to delete the paper original data, which was printed, among the paper original data on the scanner 1, namely stored in the storage device 10 disposed on the part of the scanner 1 (step S308).

After the deletion is completed, the processing is terminated.

Meanwhile, when it is found as a result of the examination in the step S305 that the pull-printing function is not supported by the available printer (step S305, NO), the paper original data is obtained from the scanner (step S309).

After the paper original data is obtained, the available printer is requested to print. Specifically, the printing instruction and the paper original data are sent to the output printer to instruct printing (step S310).

Then, the procedure moves to the above-described step S307 to perform the same processing.

When it is found as a result of the examination in the above step S302 that none of all the candidate output printers supports the pull-printing function (step S302, NO), the paper original data is obtained from the scanner (step S311).

After the paper original data is obtained, the scanner is requested to delete the paper original data to be printed stored in the storage device 10 disposed on the part of the scanner 1, namely the original of the obtained paper original data (step S312).

After the paper original data is deleted, it is checked whether any of the candidate output printers is available now (step S313), and if any of the candidate output printers is available (step S313, YES), the available printer is requested to print. Specifically, the printing instruction and the paper original data are sent to the output printer to instruct printing (step S314).

Then, it is checked whether the output printer has completed printing. In other words, it is checked whether the output printer has issued a printing completion notice (step S315).

When the output printer has completed printing (step S315, YES), the processing here is terminated.

By processing as described above, even the printing system performing the distributed and divisional output can efficiently use the pull-printable printer. Specifically, when the printer which has become available first among the multiple printers designated by the user supports the pull-printing function, the server does not obtain the paper original data but sends the reference information (URL) to the pull-printable output printer to instruct printing. Therefore, it is not necessary to make an unnecessary network transmission to output by the pull-printable printer.

Figure 6:
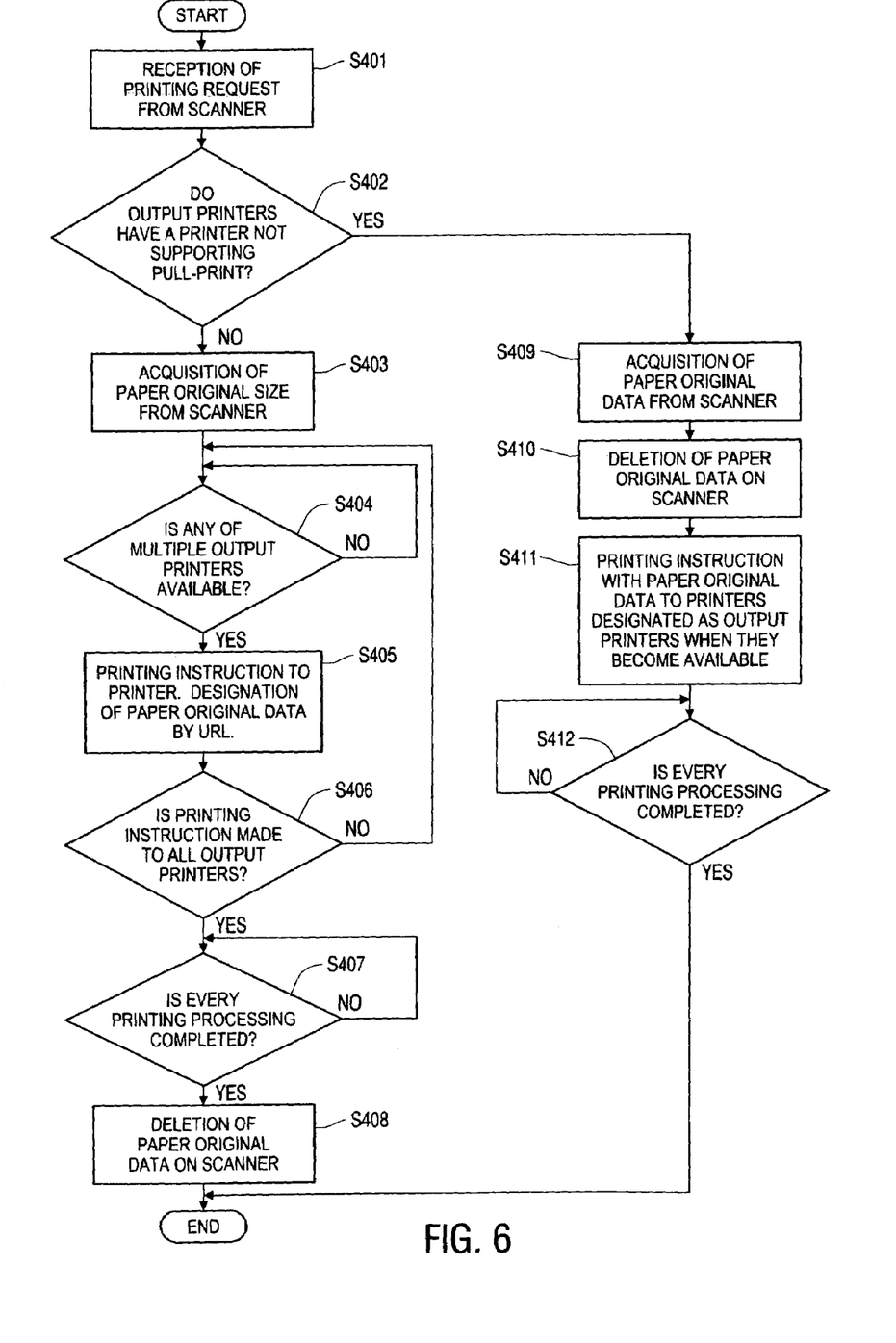
FIG. 6 is a flow chart showing a printing processing procedure by a server which has accepted a printing request from a scanner, showing a processing procedure in that when it is designated by a user to make distributed output of a printing job from selected multiple printers among multiple printers connected to the server.

FIG. 6 is a flow chart showing a printing processing procedure by the server 3 which has accepted the printing request from the scanner 1, wherein it is designated by the user to make distributed output of a printing job from selected multiple printers among the multiple printers connected to the server 3.

As shown in FIG. 6, when the server 3 accepts the printing request from the scanner 1 (step S401), it is checked whether the output printers include a printer which does not support the pull-printing function (step S402).

When the output printers do not include a printer which does not support the pull-printing function (step S402, NO), a procedure is taken to get size information about the paper original data from the scanner 1 (step S403).

After the paper original data size information is obtained, it is checked whether any of the designated multiple output printers is available (step S404).

When there is an available printer, a printing instruction is made to the printer. Specifically, the printing instruction and the reference information (URL) about the paper original data are sent to the output printer to instruct printing (step S405).

Then, it is checked whether the printing instruction was made to all the designated output printers (step S406), and if the printing instruction has not been made to all the output printers (step S406, NO), the procedure returns back to the step S404 to perform the same procedure. Specifically, the printing instruction is made to any printer, which is not requested to print, among the designated printers.

Meanwhile, when it is found as a result of the examination in the step S406 that the printing instruction is made to all the output printers (step S406, YES), it is checked whether all the output printers have completed printing (step S407).

When the printing has been completed (step S407, YES), the scanner is requested to delete the paper original data, which was printed, among the paper original data on the scanner 1, namely stored in the storage device 10 disposed on the part of the scanner 1 (step S408).

After the deletion is completed, the processing here is terminated.

Meanwhile, when it is found as a result of the examination by the above step S402 that there is a printer, which does not support the pull-printing function, among the output printers (step S402, YES), the paper original data is taken from the scanner 1 (step S409).

After the paper original data is obtained, the scanner 1 is requested to delete the paper original data to be printed stored in the storage device 10 disposed on the part of the scanner 1, namely the original of the obtained paper original data (step S410).

After the paper original data is deleted, the respective printers designated as the output printers become available and are requested to print with the paper original data transmitted (step S411). Specifically, the paper original data is not designated by the reference information (URL) to the pull-printable printers, but the obtained paper original data is sent to them to instruct printing.

Then, it is checked whether all the output printers have completed printing (step S412).

When the entire printing procedure has been completed (step S412, YES), the procedure here is terminated.

By executing the above procedure, the printing system performing the distributed and divisional output can also effectively use the pull-printable printers. Specifically, if the multiple printers designated by the user include a printer which does not support the pull-printing function, the server obtains the paper original data and sends the obtained paper original data to the output printers to instruct printing. Therefore, the user is free to select the output printers regardless of whether they are pull-printable or not. When all the printers are pull-printable, output can be started quickly because the server does not need to obtain the paper original data.

Figure 7:
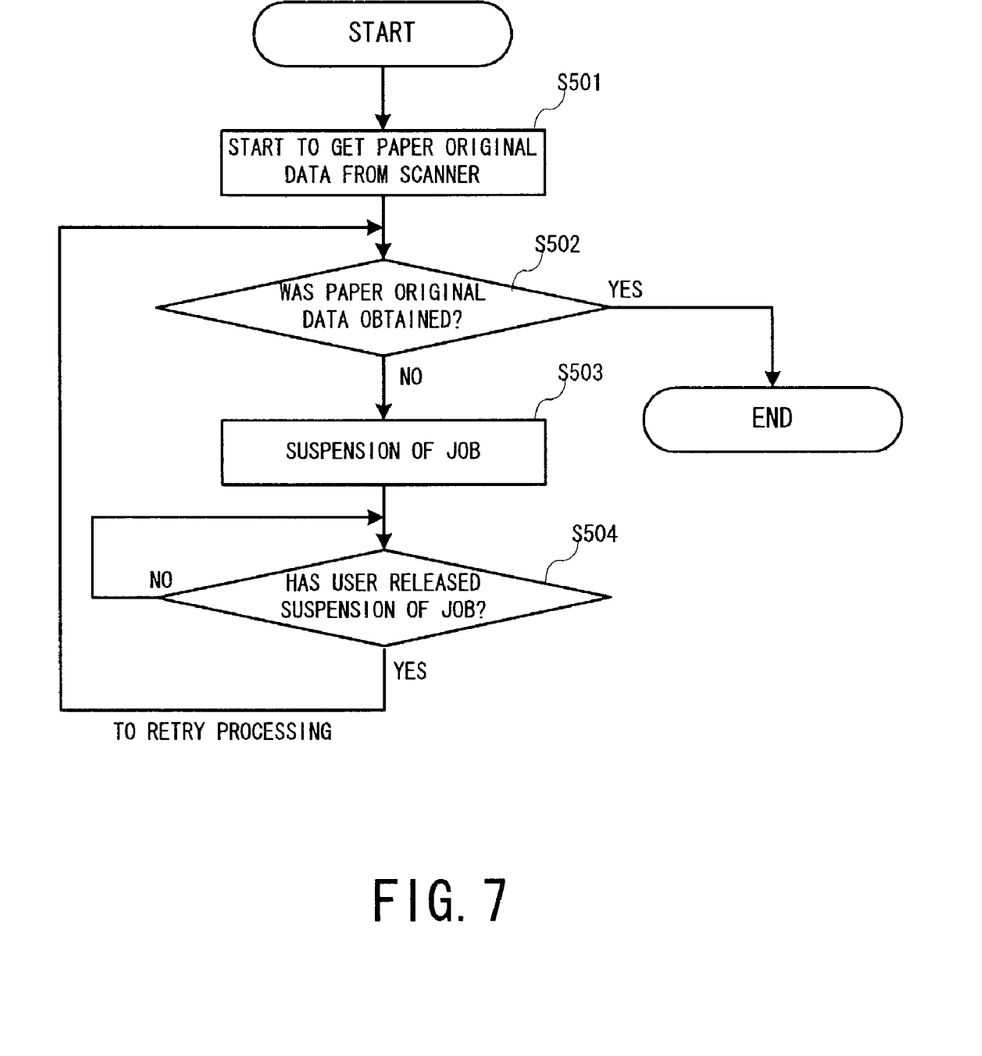
FIG. 7 is a flow chart showing a processing procedure in that when paper original data could not be obtained by a server 3 in a processing to obtain the paper original data from the scanner shown in the flows of FIG. 4 to FIG. 6.

FIG. 7 is a flow chart showing a processing procedure of a case that the paper original data could not be obtained in the procedure that the server 3 obtains the paper original data from the scanner as shown in the flows of FIG. 4 to FIG. 6.

As shown in FIG. 7, when the server 3 starts to obtain the paper original data from the scanner 1 (step S501), it is checked whether the paper original data could be obtained without any problem (step S502).

If the paper original data could not be obtained (step S502), the print job is suspended (step S503).

After the print job is suspended, it is monitored whether the user has instructed to release the suspension of the job (step S504).

When the user instructs to release the suspension of the job (step S504, YES), the procedure returns to the step S502, and the same procedure is performed. Specifically, the paper original data is obtained by a retry processing.

Meanwhile, when it is found by the step S502 that the paper original data was obtained (step S502, YES), the processing is terminated.

Figure 8:
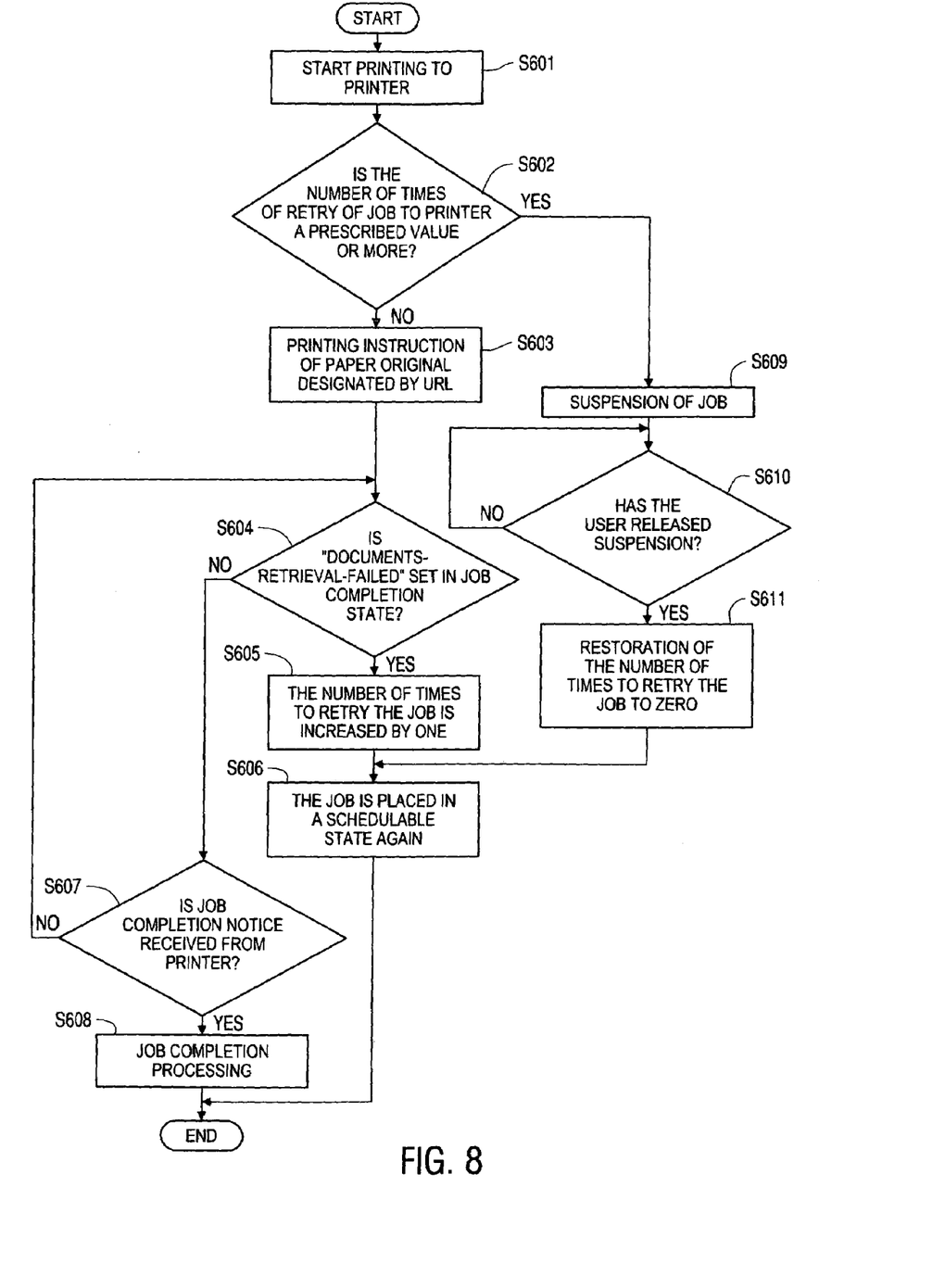
FIG. 8 is a flow chart showing a processing procedure on the part of the server when paper original data could not be obtained by a printer.

FIG. 8 is a flow chart showing a processing procedure by the server when the printer has failed to obtain the paper original data.

As shown in FIG. 8, the server 3 makes the designated output printers to start printing (step S601).

Then, the server 3 checks whether the number of times to retry to execute the print job by the printer has exceeded a previously set default value (step S602).

If the number of times to retry the printing of the job has not exceeded the default value (step S602, NO), it is instructed to print the paper original data designated by the reference information (URL) (step S603).

Then, it is judged whether a "document-retrieval-failed" is determined in a state of job termination, namely it is judged whether the output printer has determined the "document-retrieval-failed" to the job termination state and informed when the output printer could not obtain the paper original data (step S604).

When the "document-retrieval-failed" is set in the job termination state (step S604, YES), the number of times to retry the job is increased by one (step S605).

Then, the job is set again to a schedulable state. Specifically, the job is accumulated on a queue of job and scheduled again, and when the output printer becomes available, scheduling is made again (step S606).

And, the processing here is terminated.

Meanwhile, in the above step S604, when the "document-retrieval-failed" is not set in the job termination state (step S604, NO), it is checked whether the job termination notice has been received from the output printer (step S607).

Here, when the job termination notice has been received from the output printer (step S607, YES), the procedure to terminate the print job is executed (step S608). Thus, the processing is terminated.

When it is found in the step S607 that the job completion notice has not been received from the printer (step S607, NO), the procedure returns to the step S604 to execute the same procedure.

Meanwhile, when it is found in the step S602 that the number of times to retry the printing of the printing job is the default value or higher (step S602, YES), the job is kept in a suspended state (step S609).

Then, it is checked whether the user has made a request for release of the job suspension (step S610). When the user requests the release of the suspended state (step S610, YES), a processing is made to restore the number of times to try the job to "zero" (step S611).

The procedure returns to the step S606 to execute the same procedure. In other words, the job is set again to a schedulable state.

Figure 9:
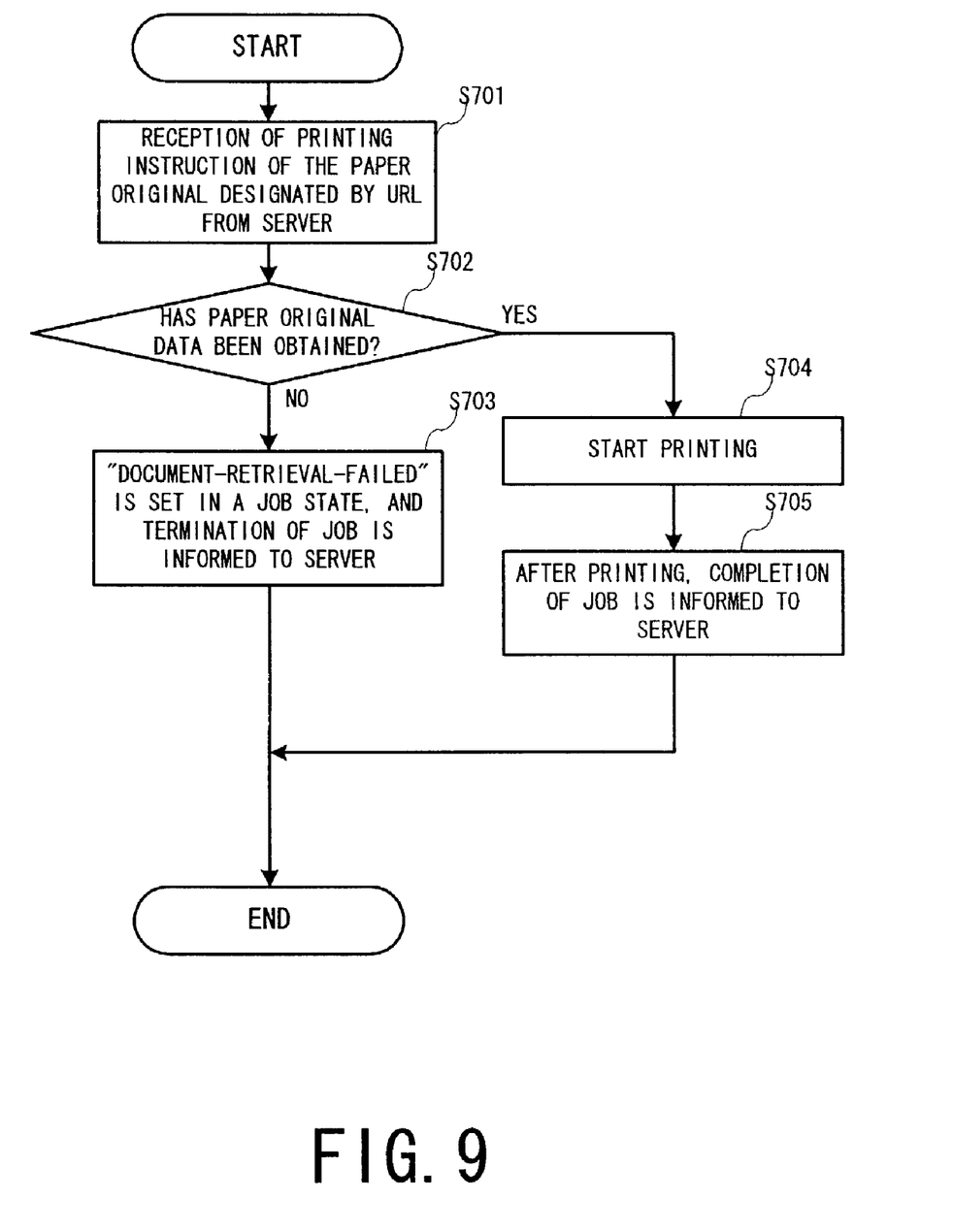
FIG. 9 is a flow chart showing a processing procedure when paper original data was not obtained by a printer.

FIG. 9 is a flow chart showing a procedure to be taken when the paper original data could not be obtained by the printer.

As shown in FIG. 9, when the server 3 makes a printing instruction of the paper original data designated by the reference information (URL) (step S701), it is checked whether the paper original data designated by the reference information (URL) was obtained by the printer without any problem (step S702).

When the paper original data has not been obtained (step S702, NO), the "document-retrieval-failed" is set to a job termination state, and the termination of job is informed to the server 3 (step S703).

Thus, the processing here is terminated.

Meanwhile, when it is found by checking in the above step S702 that the paper original data was obtained without any problem (step S702, YES), the obtained paper original data is started to be printed (step S704).

After its printing is completed, the completion of the printing job about the printing is informed to the server 3 (step S705), and the processing here is terminated.

What are described above are the operations of the present invention in general. Specifically, the present invention can save time because when the multiple printers connected to the server 3 include a printer having the pull-printing function, the server 3 does not need to obtain the paper original data. And, when the server 3 always gets the paper original data, the paper original data is transmitted two times in order of the scanner 1→the server 3→the printers 4a to 4n. But, when there is a printer having the pull-printing function, the transfer is conducted only one time from the scanner to the printer.

Besides, an operation which is not described in the above embodiments may be added as follows.

First, the server 3 is provided with a job size scheduling function which enables to allot a job only when a job size (e.g., the total number of bytes of a file) of the job to be allotted is between the upper and lower limits of the job size determined for each printer. And, in the flows shown in FIG. 4 to FIG. 6, it is possible to select an appropriate printer by making job size scheduling using the obtained size information about the paper original data with timing of obtaining size information about the paper original data based on the reference information (URL) from the scanner without obtaining the paper original data.

And, the server 3 is provided with an automatic discrimination part for a paper original data format. Specifically, this type of system assigns only the job in a paper original format supported by the printers 4a to 4n. Therefore, if a data format is not written in the printing request received when the printing request is accepted with timing to obtain size information about the paper original data based on the reference information (URL) from the scanner without obtaining the paper original data in the flows shown in FIG. 4 to FIG. 6, the paper original data designated by the reference information (URL) is partly obtained from the scanner. And, the obtained part of the paper original data is analyzed to automatically judge a format of the paper original data to make scheduling.

In the judging portion "at least one printer among the multiple printers designated does not support the pull-printing function" in the flow shown in FIG. 6, the part "at least one printer" may be made variable according to a request by the user. For example, when the user designates a numeral "N" at the time of instructing to print but "N or more printers among the multiple printers do not support the pull-printing function", the paper original data can be obtained before dividing. Thus, when the "N" becomes large, a usage rate of the network becomes high because there are many printers which can not make pull-printing, but there is an advantages that output from the pull-printable printer is started quickly.

The judging portion "at least one printer among the multiple printers designated does not support the pull-printing function" in the flow of FIG. 6 can be made to instruct the execution to obtain the paper original data according to a request by the user. For example, when the user uses a time-specified printing function to start printing in the night, it is not necessary to keep the live scanner holding the paper original data.

When the server 3 is provided with the time-specified printing function and designated to execute time-specified printing, the copy server calculates time required to transmit in view of the obtained data size and schedules to start obtaining the paper original data from time obtained by subtracting the calculated time from the designated time, thereby enabling to disperse a load on the network.

By the time-specified printing function, the paper original data can be transmitted when a usage rate of the network is low, such as after business hours. Thus, an effect on another business which was caused when a large volume of printing was executed can be reduced.

By scheduling to obtain the paper original data by the server 3 in the same order as that of printing it, unnecessary waiting time can be prevented from being produced. Generally, in order to avoid a limitation (the number of requests for obtaining paper originals which can be connected at the same time, considerable degradation in performance when paper originals are obtained in a prescribed volume or larger at the same time, or the like) of a built-in device such as a scanner, the server 3 has a queue for each scanner, and when the operation is made for the scanner, the server 3 uses the queue corresponding to the scanner to wait for order. And, the server 3 takes requests from the queue and executes so not to exceed the number of simultaneous connections determined for each scanner. When printing is instructed designating reference information (URL) to the pull-printable printer, this printing instruction is entered into the queue so to execute the printing procedure without exceeding the limitation of the scanner as the whole.

When the user selectively designates the printing request "2. Select multiple printers and output from a printer which has become available first" and the printer having the pull-printing function and the printer not having the pull-printing function have become available at the same time, the printer having the pull-printing function is used with the higher priority.

When the scanner 1 shown in FIG. 1 can be controlled to turn on or off by the network communications, the server 3 controls to turn on the scanner 1 before requesting the scanner 1 to operate or by communicating about the operation itself to the scanner 1 and to turn off the power after the operation by communications. Thus, useless power consumption by the scanner can be prevented from occurring. And, even when the power of the scanner is turned off by the user, printing can be made under control by the server 3.

When a multifunction machine having a scanner function and a printer function is used in the system shown in FIG. 1, the storage device of the multifunction machine can be directly accessed to make printing quickly if reference information (URL) received by the printer indicates the same device within the multifunction machine.

The user can determine a combination of a user name and a password for the paper original data after scanning. The password determined by the user is given to the server 3 together with the reference information (URL) indicating the paper original data. When the server 3 refers to the paper original data, the combination of the user name and the password is transmitted. The scanner checks the user name and the password and allows the operation only when they are certified. Thus, it can be prevented that the paper original data scanned by a certain user is referred to or deleted in error by another user.

It is not described in the above embodiments, but when many printers having the pull-printing function access at the same time, the job is suspended to comply with the access.

According to an aspect of the invention, since it is so configured that, when the server accepts a printing request from a printing request instruction terminal but if the printer designated as a printing destination does not have the pull-printing function to execute printing by obtaining the paper original data according to the reference information, the server obtains the paper original data according to the reference information and sends the obtained paper original data together with the printing instruction to the printer, the printing system which executes distributed and divisional output can effectively use the pull-printable printer and can effectively transfer the image data, thereby preventing the network from becoming busy.

According to an aspect of the invention, since it is so configured that, when the server accepts a printing request from a printing request instruction terminal but if the multiple printers designated as printing destinations include a printer not having the pull-printing function, the server obtains the paper original data according to the reference information and sends the obtained paper original data together with the printing instruction to each of the multiple printers, the printing system which executes distributed and divisional output can efficiently use the pull-printable printers. Thus, the image data can be sent efficiently, and the network can be prevented from becoming busy.

According to an aspect of the invention, since it is so configured that, when the accepted printing request from the user specifies distributed output by multiple printers, the server sends the reference information together with the printing instruction to each of the multiple printers if all the multiple printers designated have the pull-printing function, the output from the pull-printable printers can be started quickly.

What is claimed is:

1. A printing system configured by connecting, over a network, a printing request instruction terminal that makes a printing request including reference information that indicates a storage location of original data,
   a server that accepts the printing request from the printing request instruction terminal, designates a printer as a printing destination according to the printing request and sends a printing instruction to the designated printer, and a plurality of printers that execute printing of the original data according to the printing instruction from the server, wherein the server comprises:
   a determination unit that, when receiving the printing request from the printing request instruction terminal, determines whether or not the printer designated as the printing destination has a pull-printing function to execute printing by obtaining the original data based on the reference information; and
   a print control unit that, when it is determined that the designated printer does not have the pull-printing function, obtains the original data based on the reference information and sends the obtained original data together with the printing instruction to the designated printer; wherein:
   when the accepted printing request includes instruction to output the original data from a printer which has become available first among designated multiple printers, the determination unit determines whether or not all the designated multiple printers have the pull-printing function; and
   when it is not determined that all of the designated multiple printers has the pull-printing function, the print control unit obtains the original data based on the reference information and sends the obtained original data to the printer which has become available first together with the printing instruction.

2. The printing system according to claim 1, wherein the server further comprises a deletion unit that requests deletion of the original data from a storage of the original data, after the original data is obtained based on the reference information.

3. The printing system according to claim 1, wherein the printing request instruction terminal is a personal computer or a scanner which scans a paper original and has a storage device for storing the paper original data.

4. A printing system configured by connecting, over a network, a printing request instruction terminal that makes a printing request including reference information that indicates a storage location of original data,
   a server that accepts the printing request from the printing request instruction terminal, designates a printer as a printing destination according to the printing request and sends a printing instruction to the designated printer, and a plurality of printers that execute printing of the original data according to the printing instruction from the server, wherein the server comprises:
   a determination unit that, when receiving the printing request from the printing request instruction terminal, determines whether or not the printer designated as the printing destination has a pull-printing function to execute printing by obtaining the original data based on the reference information; and
   a print control unit that, when it is determined that the designated printer does not have the pull-printing function, obtains the original data based on the reference information and sends the obtained original data together with the printing instruction to the designated printer; wherein:
   when the accepted printing request includes instruction to output the original data from a printer which has become available first among designated multiple printers, the determination unit determines whether or not all of the designated multiple printers have the pull-printing function; and
   if any one of the designated multiple printers has the pull-printing function, the determination unit further determines whether or not the printer which has become available first among the designated multiple printers has the pull-printing function; and
   the print control unit, if it is determined that the printer which has become available first among the designated multiple printers has the pull-printing function, sends the reference information together with the printing instruction and, if it is not determined that the printer which has become available first has the pull-printing function, obtains the original data based on the reference information and send the obtained original data to the printer together with the printing instruction.

5. The printing system according to claim 4, wherein the server further comprises a deletion unit that requests deletion of the original data from a storage of the original data, after the original data is obtained based on the reference information.

6. The printing system according to claim 4, wherein the printing request instruction terminal is a personal computer or a scanner which scans a paper original and has a storage device for storing the paper original data.

7. A printing system configured by connecting, over a network, a printing request instruction terminal that makes a printing request including reference information that indicates a storage location of original data,
a server that accepts the printing request from the printing request instruction terminal, designates a printer as a printing destination according to the printing request and sends a printing instruction to the designated printer, and a plurality of printers that execute printing of the original data according to the printing instruction from the server, wherein the server comprises:
a determination unit that, when receiving the printing request from the printing request instruction terminal, determines whether or not the printer designated as the printing destination has a pull-printing function to execute printing by obtaining the original data based on the reference information; and
a print control unit that, when it is determined that the designated printer does not have the pull-printing function, obtains the original data based on the reference information and sends the obtained original data together with the printing instruction to the designated printer; wherein:
when an instruction to output the original data from multiple printers is included in the printing request, the determination unit determines whether or not the multiple printers designated as a printing destination has the pull-printing function; and
if it is determined that there is a printer which does not have the pull-printing function, the print control unit obtains the original data based on the reference information and sends the obtained original data to the multiple printers designated as the printing destination together with the printing instruction.

8. The printing system according to claim 7, wherein the server further comprises a deletion unit that requests deletion of the original data from a storage of the original data, after the original data is obtained based on the reference information.

9. The printing system according to claim 7, wherein the printing request instruction terminal is a personal computer or a scanner which scans a paper original and has a storage device for storing the paper original data.

10. A print control method in a printing system in which a printing request including reference information that indicates a storage location of original data is made from a printing request instruction terminal to a server over a network, and the server accepts the printing request, designates a printer which prints the original data according to the printing request, and sends a printing instruction to the designated printer, the method comprising:
when the server accepts the printing request from the printing request instruction terminal, checking whether or not the printer designated as a printing destination has a pull-printing function to execute printing by obtaining the original data based on the reference information;
if it is judged that the designated printer does not have the pull-printing function, obtaining the original data based on the reference information; and
sending the obtained original data together with the printing instruction from the server to the designated printer; further comprising:
if the printing request includes an instruction to output from a printer which becomes available first among multiple printers designated by a user, checking whether or not all of the multiple printers have the pull-printing function;
obtaining the original data based on the reference information if all of the designated multiple printers do not have the pull-printing function; and
sending the obtained original data together with the printing instruction to the printers.

11. The print control method according to claim 10, further comprising:
requesting deletion of the original data from a storage of the obtained original data after obtaining the original data based on the reference information.

12. The print control method according to claim 10, wherein the printing request instruction terminal is a personal computer of a user or a scanner which scans a paper original and has a storage device for storing the paper original data.

13. A print control method in a printing system in which a printing request including reference information that indicates a storage location of original data is made from a printing request instruction terminal to a server over a network, and the server accepts the printing request, designates a printer which prints the original data according to the printing request, and sends a printing instruction to the designated printer, the method comprising:
when the server accepts the printing request from the printing request instruction terminal, checking whether or not the printer designated as a printing destination has a pull-printing function to execute printing by obtaining the original data based on the reference information;
if it is judged that the designated printer does not have the pull-printing function, obtaining the original data based on the reference information; and
sending the obtained original data together with the printing instruction from the server to the designated printer; further comprising:
if the printing request includes an instruction to output from a printer which becomes available first among multiple printers designated by a user, checking whether or not all of the multiple printers have the pull-printing function;
obtaining the original data based on the reference information if all of the designated multiple printers do not have the pull-printing function;
sending the obtained original data together with the printing instruction to the printers; wherein:
if at least one printer among the designated multiple printers has the pull-printing function, further checking whether or not the printer which has become available first among the designated multiple printers has the pull-printing function;
if it is judged that the printer which has become available first among the designated multiple printers has the pull-printing function, sending the reference information together with the printing instruction to the printer; and
if it is not judged that the printer which has become available first among the designated multiple printers has the pull-printing function, obtaining the original data based on the reference information; and sending the obtained original data together with the printing instruction to the printer.

14. The print control method according to claim 13, further comprising:
requesting deletion of the original data from a storage of the obtained original data after obtaining the original data based on the reference information.

15. The print control method according to claim 13, wherein the printing request instruction terminal is a personal computer of a user or a scanner which scans a paper original and has a storage device for storing the paper original data.

16. A print control method in a printing system in which a printing request including reference information that indicates a storage location of original data is made from a printing request instruction terminal to a server over a network, and the server accepts the printing request, designates a printer which prints the original data according to the printing request, and sends a printing instruction to the designated printer, the method comprising:
when the server accepts the printing request from the printing request instruction terminal, checking whether or not the printer designated as a printing destination has a pull-printing function to execute printing by obtaining the original data based on the reference information;
if it is judged that the designated printer does not have the pull-printing function, obtaining the original data based on the reference information; and
sending the obtained original data together with the printing instruction from the server to the designated printer; further comprising:
checking, when the printing request includes an instruction to output from the multiple printers, whether or not the respective multiple printers have the pull-printing function;
if it is judged that at least one printer does not have the pull-printing function, obtaining the original data based on the reference information; and
sending the obtained original data together with the printing instruction to the printer.

17. The print control method according to claim 16, further comprising:
requesting deletion of the original data from a storage of the obtained original data after obtaining the original data based on the reference information.

18. The print control method according to claim 16, wherein the printing request instruction terminal is a personal computer of a user or a scanner which scans a paper original and has a storage device for storing the paper original data.

19. A print server which accepts a printing request including reference information that indicates a storage location of paper original data from a printing request instruction terminal via a network, designates a printer as a printing destination according to the printing request, and sends a printing instruction to the designated printer, the print server comprising:
a determination unit that, when receiving the printing request from the printing request instruction terminal, determines whether or not the printer designated as the printing destination has a pull-printing function to execute printing by obtaining the original data based on the reference information;
a print control unit that, when it is determined that the printer designated as the printing destination does not have the pull-printing function, obtains the original data based on the reference information and sends the obtained original data together with the printing instruction to the printer; wherein:
when the accepted printing request includes instruction to output the original data from a printer which has become available first among designated multiple printers, the determination unit determines whether or not all of the designated multiple printers have the pull-printing function; and
when it is not determined that all of the designated multiple printers has the pull-printing function, the print control unit obtains the original data based on the reference information and sends the obtained original data to the printer which has become available first together with the printing instruction.

20. The print server according to claim 19, wherein the server further comprises a deletion unit that requests deletion of the original data from a storage of the original data after the original data is obtained based on the reference information.

21. A print server which accepts a printing request including reference information that indicates a storage location of paper original data from a printing request instruction terminal via a network, designates a printer as a printing destination according to the printing request, and sends a printing instruction to the designated printer, the print server comprising:
a determination unit that, when receiving the printing request from the printing request instruction terminal, determines whether or not the printer designated as the printing destination has a pull-printing function to execute printing by obtaining the original data based on the reference information;
a print control unit that, when it is determined that the printer designated as the printing destination does not have the pull-printing function, obtains the original data based on the reference information and sends the obtained original data together with the printing instruction to the printer; wherein:
when the accepted printing request includes instruction to output the original data from a printer which has become available first among designated multiple printers, the determination unit determines whether or not all of the designated multiple printers have the pull-printing function;
when it is not determined that all of the designated multiple printers has the pull-printing function, the print control unit obtains the original data based on the reference information and sends the obtained original data to the printer which has become available first together with the printing instruction;
if any one of the designated multiple printers has the pull-printing function, the determination unit further determines whether or not the printer which has become available first among the designated multiple printers has the pull-printing function; and
the print control unit, if it is determined that the printer which has become available first among the designated multiple printers has the pull-printing function, sends the reference information together with the printing instruction and, if it is not determined that the printer which has become available first has the pull-printing function, obtains the original data based on the reference information and sends the obtained original data to the printer together with the printing instruction.

22. The print server according to claim 21, wherein the server further comprises a deletion unit that requests deletion of the original data from a storage of the original data after the original data is obtained based on the reference information.

23. The A print server which accepts a printing request including reference information that indicates a storage location of paper original data from a printing request instruction terminal via a network, designates a printer as a printing destination according to the printing request, and sends a printing instruction to the designated printer, the print server comprising:
  a determination unit that, when receiving the printing request from the printing request instruction terminal, determines whether or not the printer designated as the printing destination has a pull-printing function to execute printing by obtaining the original data based on the reference information;
  a print control unit that, when it is determined that the printer designated as the printing destination does not have the pull-printing function, obtains the original data based on the reference information and sends the obtained original data together with the printing instruction to the printer; wherein:
  when an instruction to output the original data from multiple printers is included in the printing request, the determination unit determines whether or not each of the designated multiple printers has the pull-printing function; and
  if it is determined that there is at least one printer which does not have the pull-printing function, the print control unit, obtains the original data based on the reference information and sends the obtained original data to the multiple printers designated as the printing destination together with the printing instruction.

24. The print server according to claim 23, wherein the server further comprises a deletion unit that requests deletion of the original data from a storage of the original data after the original data is obtained based on the reference information.

* * * * *